(12) United States Patent
Morelli et al.

(10) Patent No.: US 12,366,639 B2
(45) Date of Patent: Jul. 22, 2025

(54) SYSTEMS AND METHODS FOR LIGHT DETECTION IN LIDAR SYSTEMS

(71) Applicant: LG INNOTEK CO., LTD., Seoul (KR)

(72) Inventors: Michael V. Morelli, San Jose, CA (US); Sheng Yang Tsui, San Jose, CA (US)

(73) Assignee: LG INNOTEK CO., LTD., Seoul (KR)

( * ) Notice: Subject to any disclaimer, the term of this patent is extended or adjusted under 35 U.S.C. 154(b) by 967 days.

(21) Appl. No.: 17/599,859

(22) PCT Filed: Jan. 15, 2021

(86) PCT No.: PCT/US2021/013713
§ 371 (c)(1),
(2) Date: Sep. 29, 2021

(87) PCT Pub. No.: WO2021/150448
PCT Pub. Date: Jul. 29, 2021

(65) Prior Publication Data
US 2022/0099812 A1 Mar. 31, 2022

Related U.S. Application Data

(60) Provisional application No. 62/965,753, filed on Jan. 24, 2020.

(51) Int. Cl.
*G01S 7/48* (2006.01)
*G01S 7/484* (2006.01)
(Continued)

(52) U.S. Cl.
CPC ............ *G01S 7/4861* (2013.01); *G01S 7/484* (2013.01); *G01S 17/931* (2020.01)

(58) Field of Classification Search
CPC ........ G01S 7/484; G01S 7/486; G01S 7/4861; G01S 7/4868; G01S 7/4876; G01S 17/931
See application file for complete search history.

(56) References Cited

U.S. PATENT DOCUMENTS 7,858,917 B2 12/2010 Stern et al.
8,106,422 B2 1/2012 Veliadis
(Continued)

FOREIGN PATENT DOCUMENTS

CN 109116328 A1 1/2019
CN 110114694 A 8/2019
(Continued)

OTHER PUBLICATIONS

International Search Report of PCT/US2021/013713 mailed May 11, 2021, 3 pages.
(Continued)

*Primary Examiner* — Kevin K Pyo
(74) *Attorney, Agent, or Firm* — Birch, Stewart, Kolasch & Birch, LLP

(57) ABSTRACT

Systems and methods are provided herein for improved short range object detection in LIDAR systems. An example method may include providing, by a biasing voltage source, a first biasing voltage to a photodetector of a LIDAR system at a first time corresponding to a light emission from an emitter of the LIDAR system. The example method may also include providing, by the biasing voltage source, a second biasing voltage to the photodetector at a second time subsequent to the first time. The example method may also include receiving, by a pole/zero cancellation subcircuit of the LIDAR system, a first output signal from the photodetector. The example method may also include removing, by the pole/zero cancellation subcircuit, an undershoot or overshoot from the first output signal. The example method may also include receiving, by a first gain subcircuit, a second output signal from the pole/zero cancellation subcircuit.

20 Claims, 13 Drawing Sheets

(51) Int. Cl.
 *G01S 7/4861* (2020.01)
 *G01S 17/931* (2020.01)

(56) References Cited

U.S. PATENT DOCUMENTS

| | | |
|---|---|---|
| 9,069,060 B1 | 6/2015 | Zbrozek et al. |
| 9,299,731 B1 | 3/2016 | Lenius et al. |
| 9,304,203 B1 | 4/2016 | Droz et al. |
| 9,625,580 B2 | 4/2017 | Kotelnikov et al. |
| 9,899,544 B1 | 2/2018 | Mazzillo et al. |
| 9,911,774 B2 | 3/2018 | Grzesik |
| 10,018,505 B2 | 7/2018 | Clemens et al. |
| 10,094,925 B1 | 10/2018 | LaChapelle |
| 10,109,671 B2 | 10/2018 | Donnelly et al. |
| 10,177,181 B2 | 1/2019 | Grzesik |
| 10,205,036 B2 | 2/2019 | Mazzillo et al. |
| 10,234,546 B2 | 3/2019 | Droz et al. |
| 10,247,811 B2 | 4/2019 | Clifton |
| 10,379,540 B2 | 8/2019 | Droz et al. |
| 10,700,220 B2 | 6/2020 | Mazzillo et al. |
| 10,739,444 B2 * | 8/2020 | Hall ................ G01S 7/484 |
| 2005/0169646 A1 | 8/2005 | Bondurant et al. |
| 2017/0307738 A1 | 10/2017 | Schwarz et al. |
| 2018/0231645 A1 | 8/2018 | Droz et al. |
| 2018/0239021 A1 | 8/2018 | Akselrod et al. |
| 2018/0284240 A1 | 10/2018 | LaChapelle et al. |
| 2018/0284280 A1 | 10/2018 | Eichenholz et al. |
| 2018/0372850 A1 | 12/2018 | Frederiksen et al. |
| 2019/0131480 A1 | 5/2019 | Singh et al. |
| 2019/0178992 A1 | 6/2019 | Hall et al. |
| 2020/0044098 A1 | 2/2020 | Azuma et al. |
| 2020/0370954 A1 | 11/2020 | Fujita et al. |

FOREIGN PATENT DOCUMENTS

| | | |
|---|---|---|
| DE | 102017210684 A1 | 12/2018 |
| WO | 2016167753 A1 | 10/2016 |
| WO | 2017093453 A1 | 6/2017 |
| WO | 2018183715 A1 | 10/2018 |
| WO | 2019046581 A1 | 3/2019 |
| WO | 2019146725 A1 | 8/2019 |
| WO | 2020251787 A2 | 12/2020 |

OTHER PUBLICATIONS

Written Opinion of PCT/US2021/013713 mailed May 11, 2021, 3 pages.

* cited by examiner

US 12,366,639 B2

SYSTEMS AND METHODS FOR LIGHT DETECTION IN LIDAR SYSTEMS

CROSS REFERENCE TO RELATED APPLICATIONS

This application is the U.S. national phase of International Application No. PCT/US2021/013713 filed Jan. 15, 2021, which claims priority benefit of U.S. Provisional Patent Application No. 62/965,753, filed Jan. 24, 2020, the disclosures of which are hereby incorporated in their entireties by reference herein.

TECHNICAL FIELD

The present disclosure relates to Light Detection and Ranging (LIDAR) systems and more specifically, detector devices in LIDAR systems.

BACKGROUND

LIDAR systems may often be used for detecting objects within an environment, and are becoming more prevalent in vehicles for use in semi-autonomous and autonomous functionality. Such LIDAR system may include one or more emitter devices and one or more detector devices. The emitter devices may emit light signals at various frequencies and intensities, and in various directions outwards from the vehicle. These light signals may reflect from objects in the environment and return to the vehicle, at which point they may be received by the one or more detector devices. However, the detectors may experience a period of time following the light emission during which they are unable to detect returning light signals. This may impact the ability of the detectors to properly detect objects that are within a close range of the LIDAR system.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
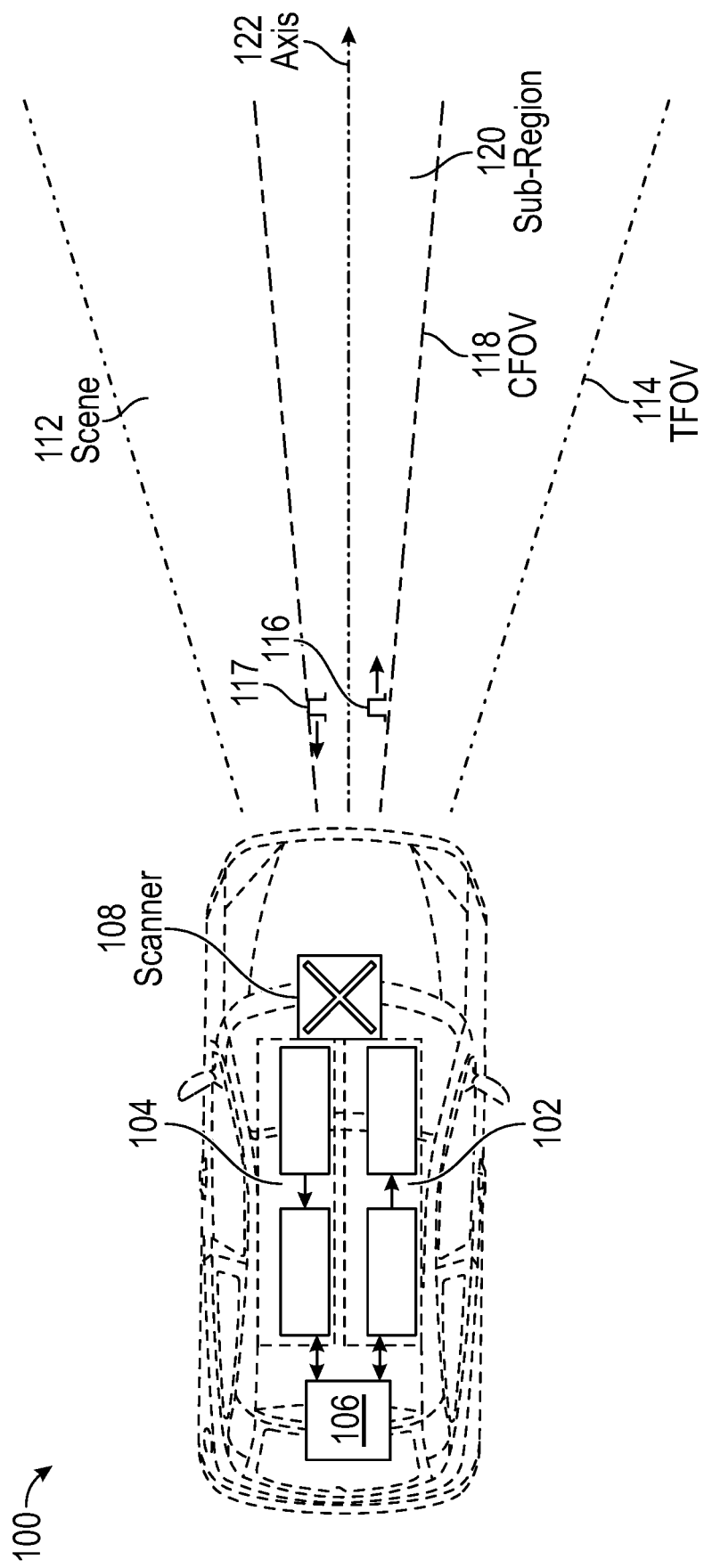
FIG. 1 depicts a schematic of an illustrative LIDAR vehicle system, in accordance with one or more example embodiments of the disclosure.

This disclosure relates to, among other things, systems and methods for improved light detection in LIDAR systems. Particularly, the systems and methods described herein may allow for improved capabilities of detector(s) (which may include one or multiple detector(s)) in the LIDAR system in detecting return light signals from objects within a short range of the LIDAR system. In some cases, the LIDAR detectors may be referred to as "photodetectors," "photodiodes," or the like herein. Additionally, reference may be made herein to a single "photodetector" or "photodiode," but the LIDAR systems described herein may also similarly include any number of such detectors. In some instances, the detectors may be photodiodes, which may be diodes that are capable of converting incoming light photons into an electrical signal. The photodiodes may be implemented in a LIDAR system that may emit light into an environment and may subsequently detect any light returning to the LIDAR system (for example, through the emitted light reflecting from an object in the environment) using the photodetectors. As one example implementation, the LIDAR system may be implemented in a vehicle (for example, autonomous vehicle, semi-autonomous vehicle, or any other type of vehicle), however the LIDAR system may be implemented in other contexts as well. The photodetectors may also more specifically be Avalanche Photodiodes (APD), which may function in the same manner as a normal photodiode, but may operate with an internal gain as well. Consequentially, an APD that receives the same number of incoming photons as a normal photodiode may produce a much greater resulting electrical signal through an "avalanching" of electrons, which may allow the APD to be more sensitive to smaller numbers of incoming photons than a normal photodiode. An APD may also operate in Geiger Mode, which may significantly increase the internal gain of the APD.

An APD may also need to undergo a recovery period following the avalanche in which the APD is quenched. Quenching the APD may refer to reducing the voltage of the APD below its breakdown voltage so that the APD may be able to detect subsequent photons. This recovery period may take tens of nanoseconds to complete, which may be problematic if light emitted from the LIDAR system reflects from components internal to the LIDAR system and is detected by the photodetector. Such internal reflections may cause the photodetector to prematurely avalanche and enter its recovery period at a time after the light is emitted by an emitter (for example, a laser diode) within the LIDAR system, but before the emitted light exits the LIDAR system and enters the environment. The environment, for example, may refer to a region of space proximate to the LIDAR system. For example, if the LIDAR system is located on a vehicle that is traversing an intersection, and is emitted light pulses, the environment may refer to the portion of the intersection at which the light pulses are being emitted. However, this is merely an example, and the environment may similarly refer to any other physical space external to the LIDAR system. Continuing with the above explanation, a photodetector avalanching as a result of internal reflections may result in the photodetector being in its recovery period for a period of time after the emitted light has entered the environment since the recovery time of the photodetector may be greater than the time it takes the emitted light to exit the LIDAR system. Consequentially, the photodetector may effectively be "blind" (for example, unable to detect photons) to short range return light. That is, if there are any objects within a short range of the LIDAR system that reflect the emitted light back to the photodetector, and the photodetector is still in its recovery period, then the photodetector may be unable to determine that the object exists in front of the LIDAR system. This may be problematic because any system that relies on the information captured by the LIDAR system may be unable to accurately and consistently detect when objects are located within a short range of the LIDAR system. For example, an autonomous vehicle that relies on a LIDAR system to perform object detection may often need to be able to detect objects as close as 10 centimeters away from the vehicle. It may take light less than a nanosecond to reach this range, so if the detector's recovery period if greater than this, then objects at this range may remain undetected.

In some embodiments, the "blind" (which may also be referred to as a "recovery" period herein) period described above may be mitigated through the use of a dynamic biasing voltage (rather than applying the same voltage every time a detector is biased) used in order to reduce the blind period of the detectors. The circuitry used to perform reduction in the blind period may be depicted in FIGS. 2 and 4, for example, and described below. For example, the circuit may include at least a buffer subcircuit, a pole/zero cancellation subcircuit, and one or more gain stages, including, for example, a first gain stage, a second gain stage, and/or a third gain stage (or any number of other gain stages). The output of the circuit may be provided to an analog to digital converter (ADC) so that the analog signal output by the photodetector may be converted to a digital signal for further processing by the LIDAR system and/or used by other vehicle systems. The buffer subcircuit, pole/zero cancellation subcircuit, and/or the gain stages may serve to process an electrical signal output by the photodetector. In some instances, the electrical signal may be an analog signal and the processing may involve improving the quality of the analog signal. For example, the buffer subcircuit, pole/zero cancellation subcircuit, and/or the gain stages may remove undershoot and/or overshoot of the signal (which may represent signal distortions), and/or otherwise process the signal so that a return signal may be more easily detectable by subsequent signal processing hardware and/or software of the LIDAR system. The pole/zero cancellation subcircuit 208 may include a resistor capacitor (RC) filter. The shape of the electrical signal before entering the pole/zero cancellation subcircuit may include a decaying exponential shape and may have an extra pole. The pole/zero cancellation subcircuit may serve to remove this pole and remove the decaying exponential shape of the electrical signal.

Turning now to the drawings, FIG. 1 is a schematic drawing of an illustrative LIDAR system according to an aspect of the present disclosure. As shown in that FIG. 1, the LIDAR system 100 may include a transmitter 102, a receiver 104, a computing system 106, and a scanner 108 may be shown as being arranged and mounted on an automobile (vehicle).

As will be readily understood by those skilled in the art, system 100 may be suitably configured and operative to interrogate a scene 112 within an overall detection region with a series of optical pulses 116 and detecting reflections of those pulses 117. From those reflections received/detected from the scene 112, the system 100 may determine the location of any objects within the scene from arrival time(s) of the reflection(s). Note that as used herein, a scene such as scene 112 may simply be a place or location where the LIDAR interrogation takes place.

As may be further observed from FIG. 1, scene 112 may be defined by a total field of view (TFOV) 214 which has a lateral extent along an x-direction and a vertical extent along a y-direction.

In some embodiments, transmitter 102 may be a system for generating and/or transmitting optical signals (not specifically shown) that generally may include a train of relatively short-duration optical (laser) pulses. As may be appreciated, such optical signals may include a first divergence in the y-direction (i.e., vertical) and a second divergence in the x-direction (i.e., horizontal).

In some embodiments, receiver 104 may include a focal-plane array comprising, for example, an array of pixels, each of which may include a single-photon detector and optics that define the instantaneous field-of-view of the pixel. In the illustrative embodiment shown in FIG. 1, the optics of each pixel may provide an instantaneous field-of-view (IFOV) of approximately 0.2 degrees in the x-direction and approximately 1.4 degrees in they direction (as well as any other degree values in either direction). The optics of the pixels may advantageously be collectively dimensioned and arranged to compress the IFOVs of the pixels along the x-direction such that they may collectively form a composite field-of-view 118 such that it may exhibit substantially no gaps between the IFOVs of the individual pixels. In other words, it may exhibit a continuous field-of-view in each dimension.

With continued reference to FIG. 1, computing system 106 may include any of a variety of known, integrated or discrete systems that among other things receive signals from receiver 104, determine object locations based on signals, generating a point cloud for a scene 112, controlling scanner 108, and the like. The computing system 106 may be described in more detail with respect to computing system 1300 of FIG. 13.

In some embodiments, the scanner 108 may be operative to scan optical signal(s) and CFOV 118 across scene 112 during a scan period such that overall system 100 may interrogate and sample the entirety of scene 112 during each such scan period. As may be readily appreciated, the particular choice of scanner may be a matter of design choice. Accordingly, scanner 108 may include a galvanometer scanner, a rotating, multi-faceted mirror, a scanning MEMS mirror, and/or a transmissive element(s) (i.e., a scanning prism, etc.) that steers optical signals via any of a number of known mechanisms including refraction, and the like. Those skilled in the art will of course recognize that a scanner 108 according to the present disclosure may further include a mix of the scanning elements described and/or known.

Figure 2:
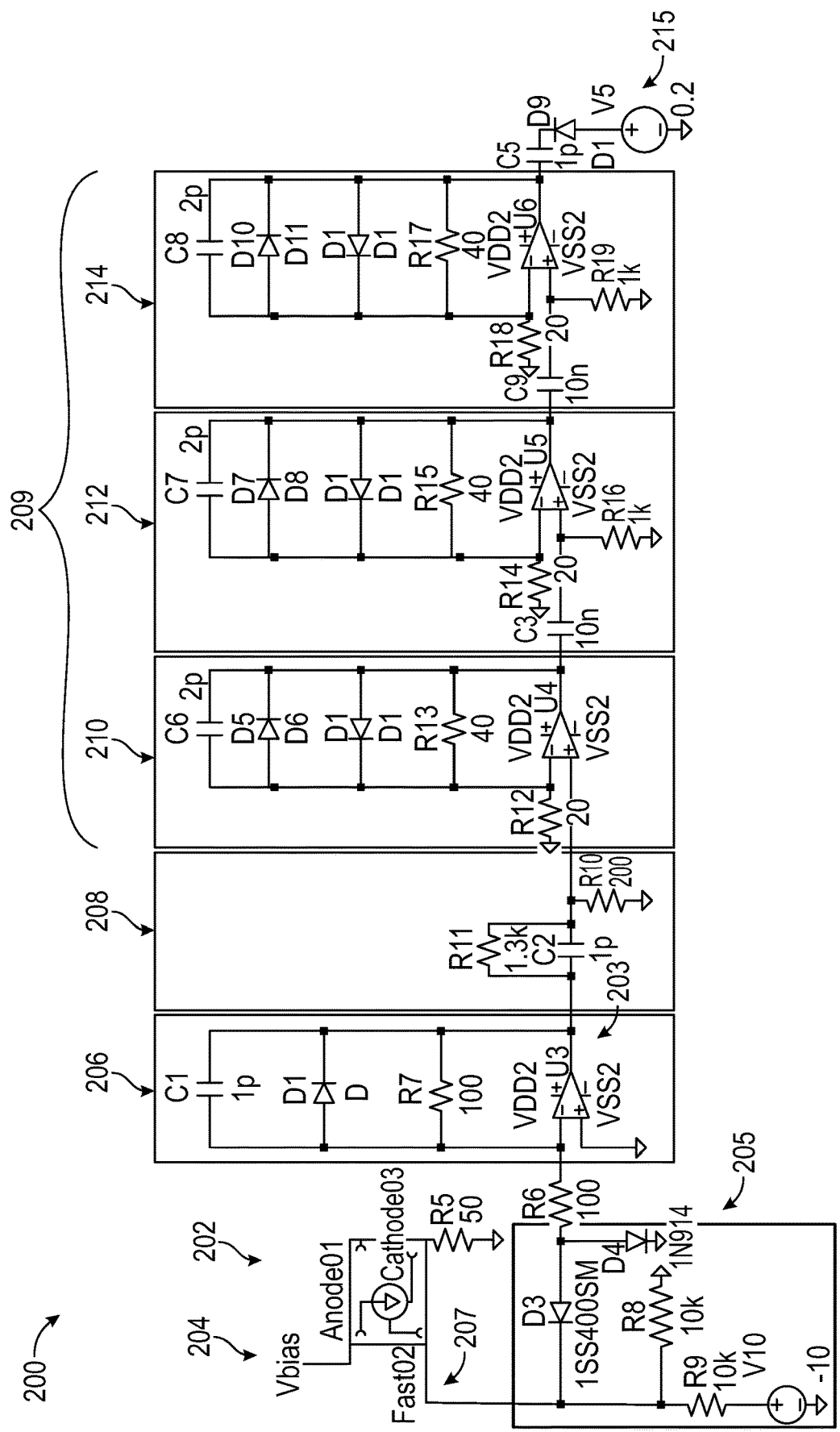
FIG. 2 depicts an example circuit, in accordance with one or more example embodiments of the disclosure.

FIG. 2 depicts an example circuit 200. The circuit 200 may be one example of a circuit used to dynamically apply a biasing voltage to a photodetector 202 that may mitigate a blind period of the photodetector 202 as described above. In some embodiments, the circuit 200 may include a photodetector 202 that may detect returning signals that were previously emitted by an emitter device (not shown in the figure), and may also include additional circuitry for setting a biasing voltage of the photodetector 202 and/or processing an output signal of the photodetector 202 (for example, to improve the quality of the signal output by the photodetector 202, among other reasons). In some instances, the photodetector 202, emitter device, and additional circuitry may form a portion of a vehicle LIDAR system used to identify objects in an environment of the vehicle. That is, the LIDAR system may emit a light signal from the emitter device and detect return signals reflecting from objects in the environment through the photodetector 202. The return signal may then be used to discern various types of information about the objects in the environment, such as their size, shape, and location relative to the vehicle, among other information. In some instances, more than one photodetector 202 may be used. Additionally, in some cases, the elements depicted in FIG. 2 may also be implemented in any other type of system as well.

In some embodiments, the circuit 200 may also include a biasing voltage source 204, a switching subcircuit 205, a buffer subcircuit 206, a pole/zero cancellation subcircuit 208, one or more gain stages 209, including, for example, a first gain stage 210, a second gain stage 212, and/or a third gain stage 214 (or any number of other gain stages), and/or a baseline shifting subcircuit 215. The output of the circuit 200 may be provided to an analog to digital converter (ADC) (not depicted in the figure) so that the analog signal output by the photodetector 202 may be converted to a digital signal for further processing by the LIDAR system and/or used by other vehicle systems.

In some embodiments, the photodetector 202 may receive light energy in the form of photons, and may convert the light energy into electrical energy for further processing by the circuit 200. That is, the photodetector 202 may receive photons as inputs and may produce an electrical signal as an output. As mentioned above, the photons may be associated with a return signal that is based on light that is emitted by the emitter device of the LIDAR system (for example, the emitter device may emit light, the light may reflect from an object in the environment external to the LIDAR system, may return back to the LIDAR system, and then may be detected by the detectors. In some instances, the photodetector 202 may be a Silicon Photomultiplier (SiPM), Avalanche Photodiode (APD), or any other type of photodetector 202, as well as any other type of detector device described herein.

In some embodiments, the biasing voltage source 204 may be responsible for setting a biasing voltage of the photodetector 202. The biasing voltage of the photodetector 202 may determine the size of the depletion region of the photodetector 202, and thus, may determine when the photodetector 202 can receive returning photons. In some embodiments, a reverse bias may be applied to photodetector 202. However, in another cases, no bias or a forward bias may also be applied. For example, to apply a reverse bias to the photodetector 202, an external voltage (for example, Vbias from the biasing voltage source 204) may applied to a P-N junction (not shown in the figure) of the photodetector 202. The negative terminal may connected to the positive P layer, and the positive terminal may connected to the negative N layer. This may cause the free electrons in the N layer to pull toward the positive terminal, and the holes in the P layer to pull toward the negative terminal. When the external voltage is applied to the photodiode, the free electrons may start at the negative terminal and immediately fill the holes in the P layer with electrons. This may create negative ions in the atoms with extra electrons. The charged atoms may then oppose the flow of free electrons to the P layer. Similarly, holes may undergo the same process to create positive ions but in the opposite direction. When reverse biased, current may only flow through the photodiode with incident light creating photocurrent. The reverse bias may cause the potential across the depletion region to increase and the width of the depletion region to increase. This may be ideal for creating a large area to absorb the maximum amount of photons. The biasing voltage may also be applied to the photodetector 202 in any other manner as well (for example, depending on the type of photodetector 202). Additionally, the switching subcircuit 205 may be synchronized with the biasing voltage source 204 and may function to prevent saturation of the optical amplifier 203, which may be electrically connected to an output 207 of the photodetector. That is, the switching subcircuit 205 may be located between the output 207 of the photodetector 202 and the optical amplifier 203, which may be a part of the buffer subcircuit. The switching subcircuit 205 may connect the output 207 of the photodetector 202 to any other portions of the circuit 200 as well.

In some instances, a photodetector 202 may experience a blind period during which it may be unable to detect returning light signals (for example, photons). This blind period may occur upon firing of the emitter device, as an emission from the emitter device may result in an overload of photons at the photodetector 202, which may saturate the photodetector 202. The blind period may impact the ability of the photodetector 202 to detect objects within a short range of the photodetector 202 (for example, those that generate return signals that arrive at the photodetector 202 in less than 10 nanoseconds), as the return signals from such short range objects may return to the photodetector 202 while the photodetector 202 is within this blind period, which may render the photodetector 202 unable to detect the return signal. To improve the capability of the photodetector 202 to detect return signals from objects at a short range, the biasing voltage source 204 may dynamically adjust the biasing voltage applied to the photodetector 202.

As one particular example, the biasing voltage of the photodetector 202 may be modulated between 20 volts to 37 volts. The lower voltage (for example, 20 volts) may be applied upon firing of the emitter device, which may serve to effectively turn off or reduce the sensitivity of the photodetector 202 during this time. This may serve to prevent or mitigate the blind period of the photodetector 202, as the photodetector 202 may be less sensitive to saturation from photons being emitted by the emitter device. For example, lowering the biasing voltage applied to the photodetector 202 during this time may mitigate a scenario where backscattered light from is detected by the photodetector 202 and causes the photodetector 202 to prematurely saturate and enter its recovery period. After the firing interval is completed, the biasing voltage may then be set to the higher voltage value (for example, 37 volts) to achieve a higher gain of the photodetector 202. While the example provided above may include voltage values of 20V and 37V, any other voltage values may similarly be used as well.

In some embodiments, the buffer subcircuit 206, pole/zero cancellation subcircuit 208, the gain stages 209, and/or the baseline shifting subcircuit 215 may serve to adjust an electrical signal output (for example, output 207 or any other output of the photodetector 202) by the photodetector 202.

In some instances, the electrical signal may be an analog signal and the adjustments may involve improving the quality of the analog signal. For example, the buffer subcircuit 206, pole/zero cancellation subcircuit 208, and/or the gain stages 209 may remove undershoot and/or overshoot of the signal (which represent signal distortions), and/or otherwise adjust the signal so that a return signal received by the photodetector 202 may be more easily detectable by the LIDAR system. The pole/zero cancellation subcircuit 208 may include a resistor capacitor (RC) filter. The shape of the electrical signal before entering the pole/zero cancellation subcircuit 208 may include a decaying exponential shape and may have an extra pole. The pole/zero cancellation subcircuit 208 may serve to remove this pole and remove the decaying exponential shape of the electrical signal. The gain stages (e.g., gain stage 210, gain stage 212, and gain stage 214) may serve to amplify the signal output by the photodetector 202. The output of the gain stages 209 may be provided to an analog to digital converter (ADC), which may convert the electrical signal into a digital signal for further processing by the LIDAR system. It should be noted that although some of the figures presented herein may depict example values for different circuit components (for example, resistance values for resistors, voltage values for voltage sources, etc.), these values are not intended to be limiting, and components with any other values may also be applicable.

Figure 3:
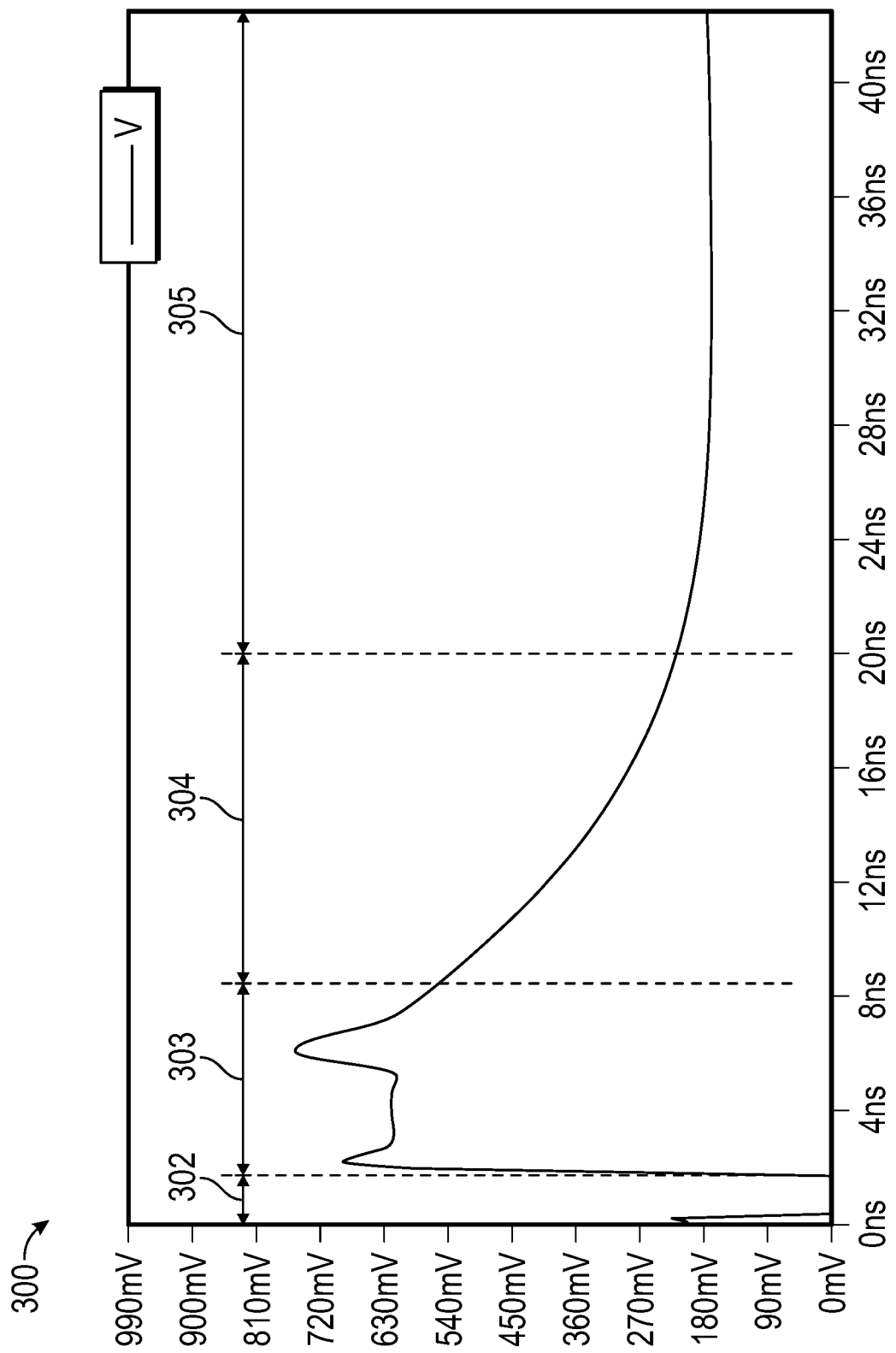
FIG. 3 depicts a plot of an electrical signal, in accordance with one or more example embodiments of the disclosure.

FIG. 3 depicts an example plot 300 of an electrical signal output of a photodetector (for example, photodetector 202 depicted in FIG. 2 and/or photodetector 402 depicted in FIG. 4 described below). That is, the electrical signal shown in plot 300 may represent a plot of the initial electrical signal before it is introduced to the circuit 200. The plot 300 may depict the voltage levels of the electrical signal over time. The plot 300 may include multiple regions of interest, including a blind region 302, a saturation region 303, a partial dynamic region 304 and/or a full dynamic region 305. In some instances, the blind region 302 may include a period of time during which the photodetector 202 is unable to detect any returning photons (for example, any return light) from the environment, and thus may be "blind" to any return signals. This blind region 302 of the photodetector may occur subsequent to a firing of the emitter device (for example, emitting light from the emitter device). The blind region 302 may be undesirable as it may limit the ability of the photodetector to detect photons being reflected from objects that are within a relatively short distance from the photodetector. In some instances, the saturation region 303 may represent a region of operation during which the photodetector experiences saturation, and consequentially a non-linear relationship between input power and output current at the photodetector. The partial dynamic region 304 and full dynamic region 305 may represent regions during which the photodetector may be approaching linearity and may be experiencing linearity. During the partial dynamic region 304 and the full dynamic region 305, the photodetector may be able to effectively detect any return light. Additionally, it should be noted that although the figure may be described with respect to the photodetector approaching "linearity," some photodetectors may not involve linear responses. For example, an avalanche photodetector operating in Geiger Mode may involve a substantial non-linear gain.

Figure 4:
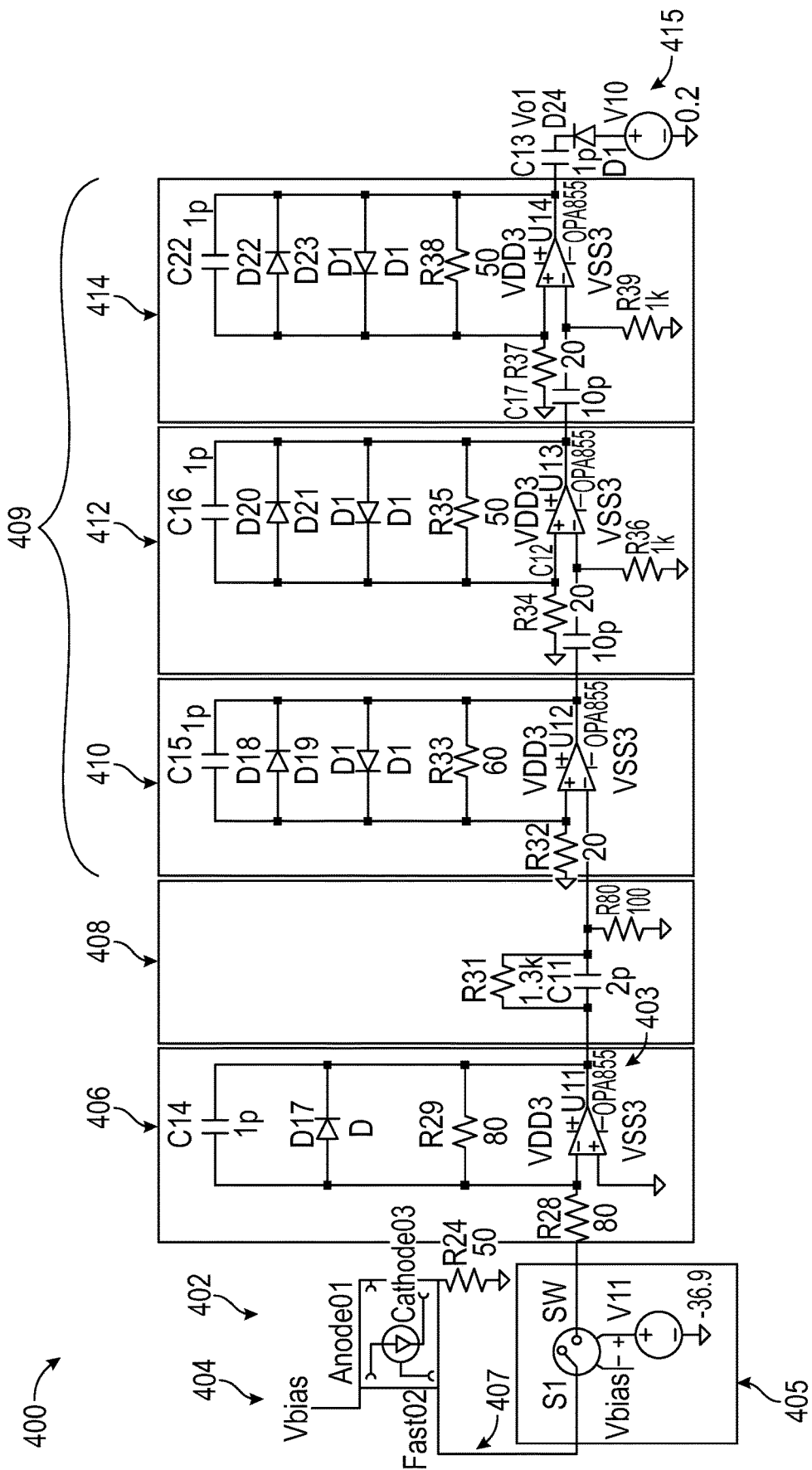
FIG. 4 depicts an example circuit, in accordance with one or more example embodiments of the disclosure.

FIG. 4 depicts another example circuit 400. The circuit 400 may be another example of a circuit used to dynamically apply a biasing voltage to a photodetector 402 that may mitigate a blind period of the photodetector 402 as described above. In some embodiments, the circuit 400 may be similar to circuit 200 described above. That is, photodetector 402 may be similar to or the same as photodetector 202, buffer subcircuit 406 may be similar to or the same as photodetector 202, pole/zero cancellation subcircuit 408 may be similar to or the same as pole/zero cancellation subcircuit 208, the gain stages 409 may be similar to or the same as the gain stages 209 (e.g., gain stage 410 may be the same as or similar to gain stage 210, gain stage 412 may be the same as or similar to gain stage 212, and gain stage 414 may be the same as or similar to gain stage 214), and/or the baseline shifting subcircuit 415 may be the same as baseline shifting subcircuit 415. Any other elements of subcircuit 400 may also be the same as, or similar to, elements of subcircuit 200 as well. The circuit 400, however, may differ from the circuit 200 in that the switching subcircuit 405 may include different elements than the switching subcircuit 205. For example, the switching subcircuit 405 may include a switch, whereas the switching subcircuit 205 may include one or more diodes. It should be noted that reference may be made herein to particular elements of circuit 200, but such explanations may also apply to corresponding elements of circuit 400 (e.g., photodetector 202 and photodetector 402).

In some embodiments, the biasing voltage source 404 may be responsible for setting a biasing voltage of the photodetector 402. The biasing voltage of the photodetector 402 may determine the size of the depletion region of the photodetector 402, and thus, may determine when the photodetector 402 can receive returning photons. In some embodiments, a reverse bias may be applied to photodetector 402. However, in another cases, no bias or a forward bias may also be applied. Additionally, the switching subcircuit 405 may be in synch with the biasing voltage source 404 and may function to prevent saturation of the optical amplifier 403. In some instances, a photodetector 402 may experience a blind period during which it is unable to detect returning light signals (for example, photons). This blind period may occur upon firing of the emitter device, as an emission from the emitter device may result in an overload of photons at the photodetector 402, which may saturate the photodetector 402. The blind period may impact the ability of the photodetector 402 to detect objects within a short range of the photodetector 402 (for example, those that generate return signals that arrive at the photodetector 402 in less than 10 nanoseconds), as the return signals from such short range objects may return to the photodetector 402 while the photodetector 402 is within this blind period, which may render the photodetector 402 unable to detect the return signal. To improve the capability of the photodetector 402 to detect return signals from objects at a short range, the biasing voltage source 404 may dynamically adjust the biasing voltage applied to the photodetector 402.

As one particular example, the biasing voltage of the photodetector 402 may be modulated between 20 volts to 37 volts. The lower voltage (for example, 20 volts) may applied upon firing of the emitter device, which may serve to effectively turn off or reduce the sensitivity of the photodetector 402 during this time. This may serve to prevent or mitigate the blind period of the photodetector 402, as the photodetector 402 is less sensitive to saturation from photons being emitted by the emitter device. After the firing interval is completed, the biasing voltage may then be set to the higher voltage value (for example, 37 volts) to achieve a higher gain of the photodetector 402.

In some embodiments, the buffer subcircuit 406, pole/zero cancellation subcircuit 408, and/or the gain stages 409 may serve to adjust an electrical signal output (for example, electrical signal 407 or any other electrical signal) by the photodetector 402. In some instances, the electrical signal may be an analog signal and the processing may involve improving the quality of the analog signal. For example, the buffer subcircuit 406, pole/zero cancellation subcircuit 408, and/or the gain stages 409 may remove undershoot and/or overshoot of the signal (which represent signal distortions), and/or otherwise adjust the signal so that a return signal may be more easily detectable. The pole/zero cancellation subcircuit 408 may include a resistor capacitor (RC) filter. The shape of the electrical signal before entering the pole/zero cancellation subcircuit 408 may include a decaying exponential shape and may have an extra pole. The pole/zero cancellation subcircuit 408 may serve to remove this pole and remove the decaying exponential shape of the electrical signal. The gain stages (e.g., gain stage 410, gain stage 412, and gain stage 414) may serve to amplify the signal output by the photodetector 402. The output of the gain stages 409 may be provided to an analog to digital converter (ADC), which may convert the electrical signal into a digital signal for further processing by the LIDAR system.

Figure 5:
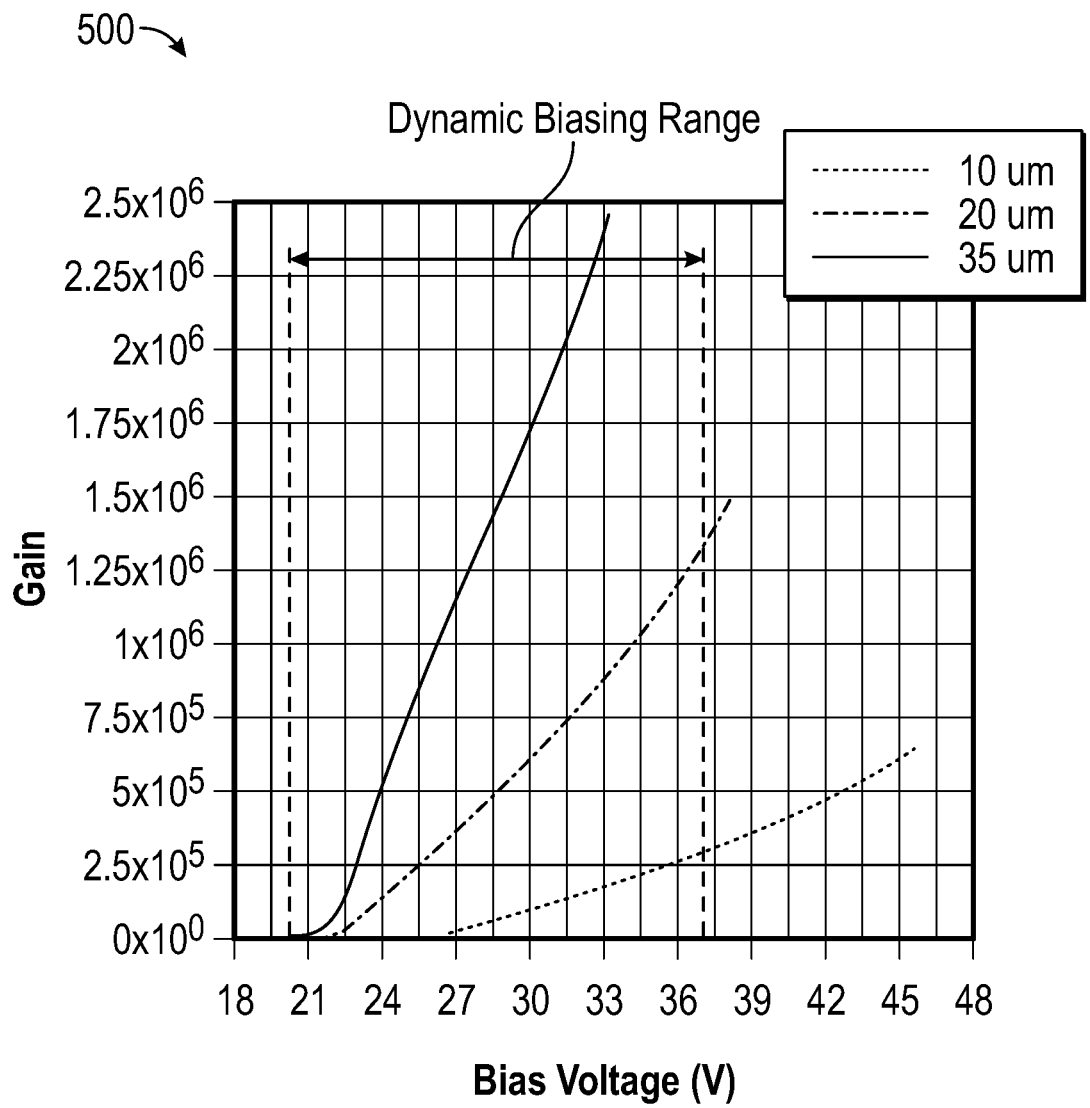
FIG. 5 depicts an example biasing voltage plot, in accordance with one or more example embodiments of the disclosure.

FIG. 5 depicts an example plot 500. The plot 500 may depict gain (for example, the gain of a photodetector) versus biasing voltage (for example, a biasing voltage that is applied to the photodetector) for three different example photodetectors through a dynamic biasing range between 20 volts and 37 volts. As may be seen in plot 500, the gain of the photodetector may increase as the biasing voltage applied to the photodetector is increased. The gain may influence the level of electrical signal that is produced based on a given number of input photons to the photodetector. For example, as described above, an APD that receives the same number of incoming photons as a normal photodiode will produce a much greater resulting electrical signal through an "avalanching" of electrons, which allows the APD to be more sensitive to smaller numbers of incoming photons than a normal photodiode. This may be because the gain of the APD may be relatively large.

Figure 6:
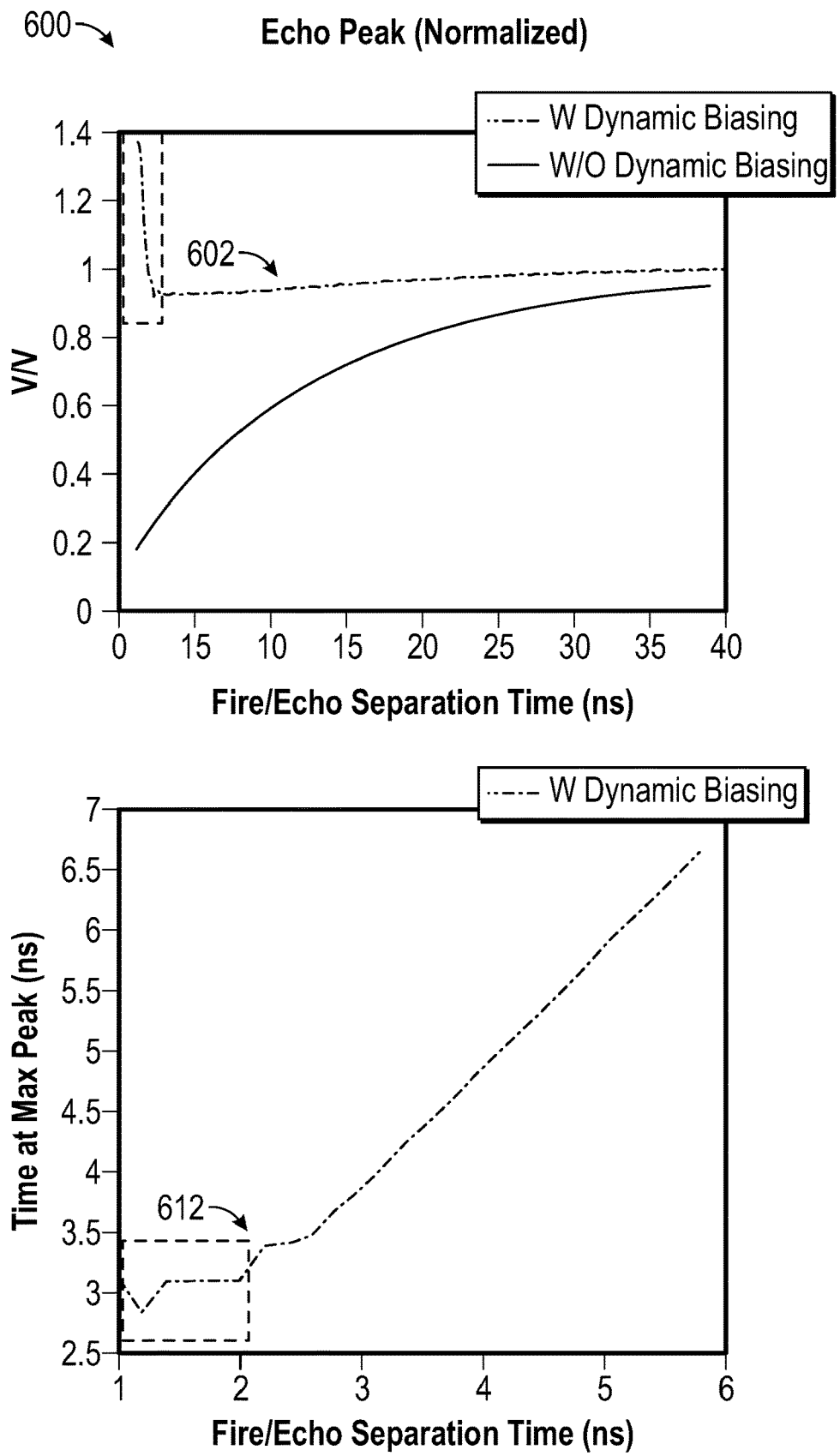
FIG. 6 depicts one or more plots showing echo (e.g., return light signal) amplitude versus pulse separation time, in accordance with one or more example embodiments of the disclosure.

FIG. 6 depicts plots (for example, plot 600 and plot 610) showing echo (for example, return light signal) amplitude versus fire and/or echo separation time (for example, a time between subsequent firings of an emitter device of the LIDAR system). With dynamic biasing, detectability of return light signals by a photodetector of the LIDAR system can be greatly improved. However, interference and underdamping may distort an echo pulse when separation time is less than two nanoseconds. For example, plot 600 may depict a magnitude of an echo peak at varying fire and/or echo separating times in nanoseconds (the x-axis). As depicted at portion 602 of the plot 600, with dynamic voltage bias being applied to the photodetector, there may be a spike in value below 2 ns, for example. Plot 610 may depict a time at a max peak (in nanoseconds) versus a fire and/or echo separation time (in nanoseconds). Portion 612 of the plot 610 may also highlight the portion of the signal less than two nanoseconds, which may depict a non-linear relationship, whereas the remainder of the plot from at and/or after two nanoseconds may depict a more linear relationship. That is, in both plot and plot 610, the signal may behave differently before two nanoseconds than after two nanoseconds when dynamic bias voltages are being applied to the photodetector. The two nanosecond value may also be an arbitrary value, and any other time may also apply.

Figure 7:
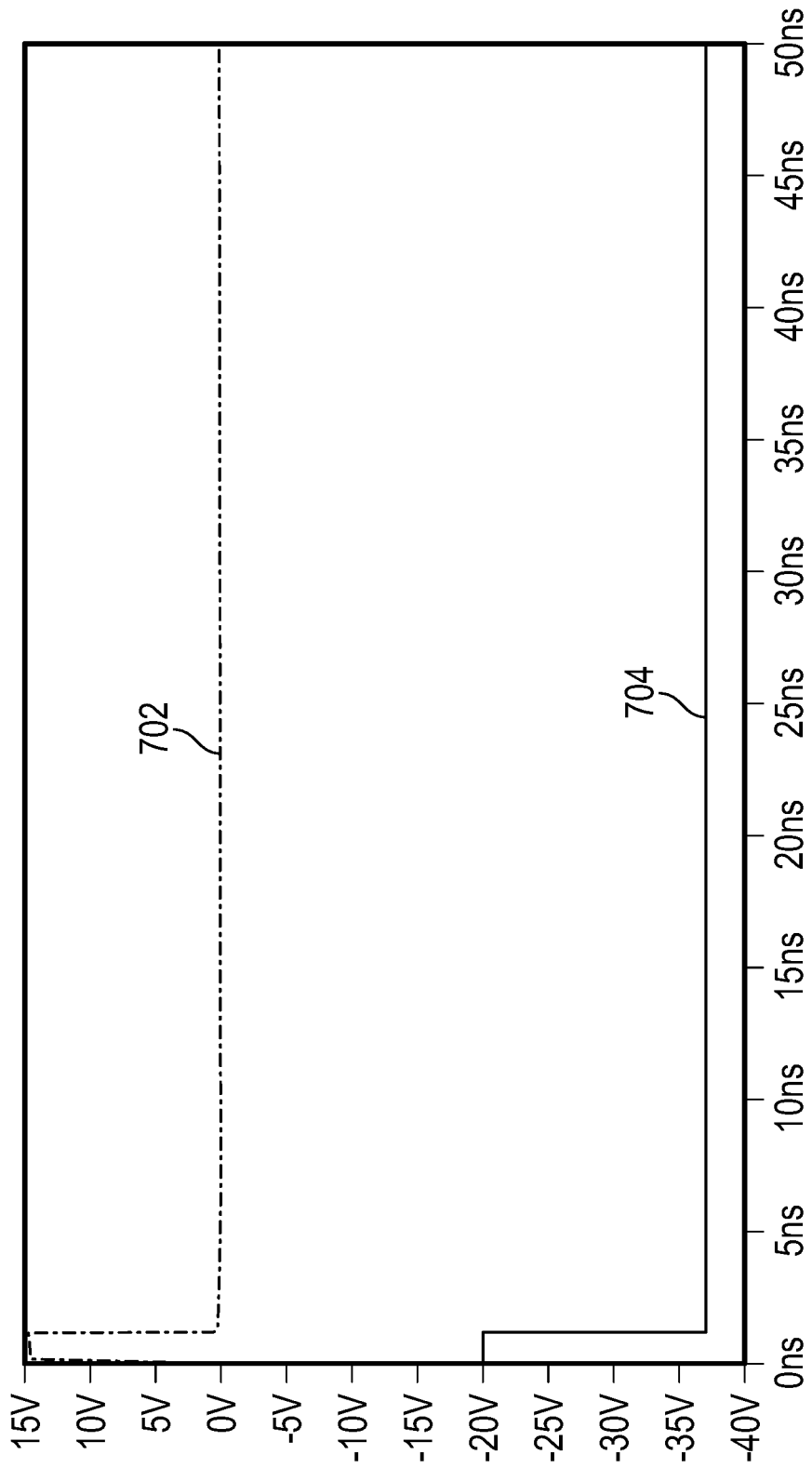
FIG. 7 depicts a plot of an electrical signal, in accordance with one or more example embodiments of the disclosure.

FIG. 7 depicts an example biasing voltage plot 700. In some embodiments, the biasing voltage plot 700 may include a signal 702 showing a fast output of the photodetector and a biasing voltage signal 704, which may represent a biasing voltage being applied to a photodetector (for example, photodetector 202 depicted in FIG. 2 and/or photodetector 402 depicted in FIG. 4). In some instances, the biasing voltage signal 704 may be applied to the photodetector by the biasing voltage subcircuit (for example, biasing voltage source 204 with respect to FIG. 2 or biasing voltage subcircuit 404 with respect to FIG. 4). As may be seen in the biasing voltage signal 704, the biasing voltage may be set to a lower voltage (e.g., 20 volts) for a first period of time, and then subsequently set to a higher voltage value (e.g., 37 volts) for a second period of time. In some instances, the first period of time may correspond to a blind period of the photodetector as shown in blind region 302 of FIG. 3, and the second period of time may represent a time period during which the photodetector may be able to detect returning photons. That is, the first period of time may correspond to firing of the emitter device that would normally cause saturation of the photodetector 202. Applying a biasing voltage of 20 volts (or any other similarly low voltage value) may effectively turn off or reduce the sensitivity of the photodetector during this firing period. This may improve the short-range detectability of the photodetector as it may reduce the period of time during which the photodetector is blind to returning photons. Subsequent to this re-charging period, the biasing voltage can be set to the higher voltage value (e.g., 37 volts) to achieve a higher gain. It should be noted that 20 and 37 volts are merely example biasing voltages, and any other voltage values may also be used. 20 volts may be selected instead of zero volts because 20 volts may be below a threshold performance level of the photodetector, and may effectively be the same as zero volts. However, zero volts or any voltage value between zero and 20, as well as any other voltage value, may similarly be used. Additionally, although a square wave is depicted in plot 700, any other type of waveform may be utilized for setting the biasing voltage.

Figure 8:
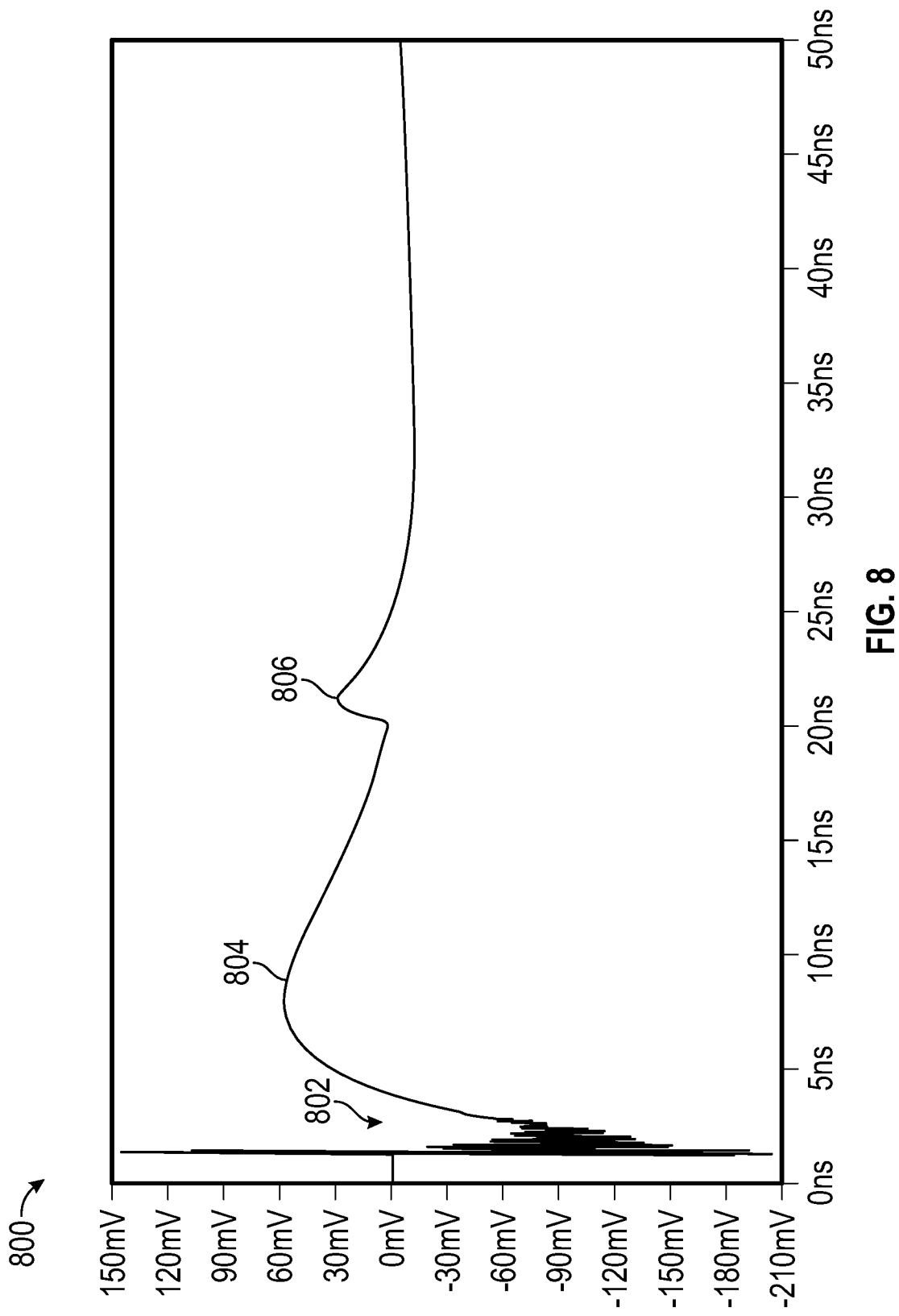
FIG. 8 depicts a plot of an electrical signal, in accordance with one or more example embodiments of the disclosure.

FIG. 8 depicts an example plot 800. In some embodiments, the plot 800 may depict an example electrical signal output of a photodetector, which may represent a return signal 806 that is detected at the photodetector (for example, such as photodetector 202 and/or 402) before the signal is processed by the remaining circuit elements (that is, before the signal is input into the buffer subcircuit 206 (or the buffer subcircuit 406)). This return signal 806 may represent a signal (for example, a light signal which may be in the form of one or more photons) that was emitted by an emitting device of the LIDAR system, deflected back from an object in the environment, and detected by the photodetector. As may be seen in the plot 800, the saturation region before two nanoseconds may be removed or mitigated. However, a period of undershoot 802 and/or overshoot 804 (signal distortions) may be present in the signal. The undershoot 802 and/or overshoot 804 may be undesirable because it may make identifying the return signal 806 more difficult because the amplitude of the undershoot 802 and/or overshoot 804 may be similar to or greater than the amplitude of the return signal 806.

Figure 9:
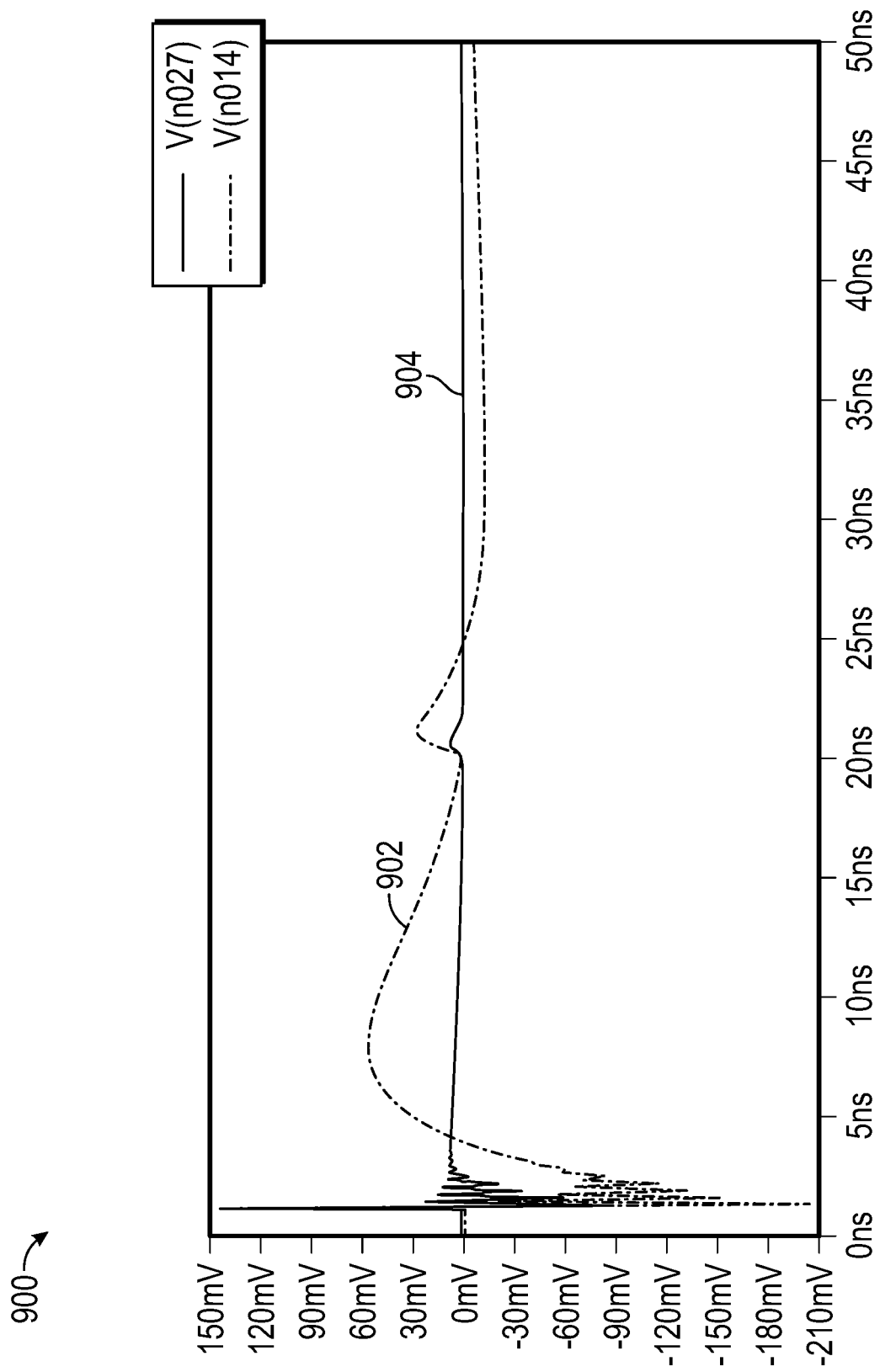
FIG. 9 depicts a plot of an electrical signal, in accordance with one or more example embodiments of the disclosure.

FIG. 9 depicts an example plot 900. Plot 900 may depict electrical signal 902 and electrical signal 904. Electrical signal 902 may be the same or similar to the electrical signal depicted in plot 800 with respect to FIG. 8. That is, electrical signal 902 may represent the electrical signal at the output of the photodetector before being input to the buffer subcircuit. Electrical signal 904 may represent the electrical signal after being processed and output by the pole/zero cancellation subcircuit 208 (or cancellation subcircuit 408). In some instances, plot 900 may depict a comparison between the electrical signal 902 before entering the pole/zero cancellation subcircuit, and the electrical signal 904 after it is processed by the pole/zero cancellation subcircuit. As can be seen in plot 900, the pole/zero cancellation subcircuit may remove some or all of the overshoot and/or undershoot from the electrical signal. As described above, removing or mitigating the undershoot and/or overshoot may make identification of the return signal easier relative to the remainder of the signal present in the plot 900. This may be because the amplitude of the return signal is now relatively greater than the remainder of the signal, and thus more easily detectable.

Figure 10:
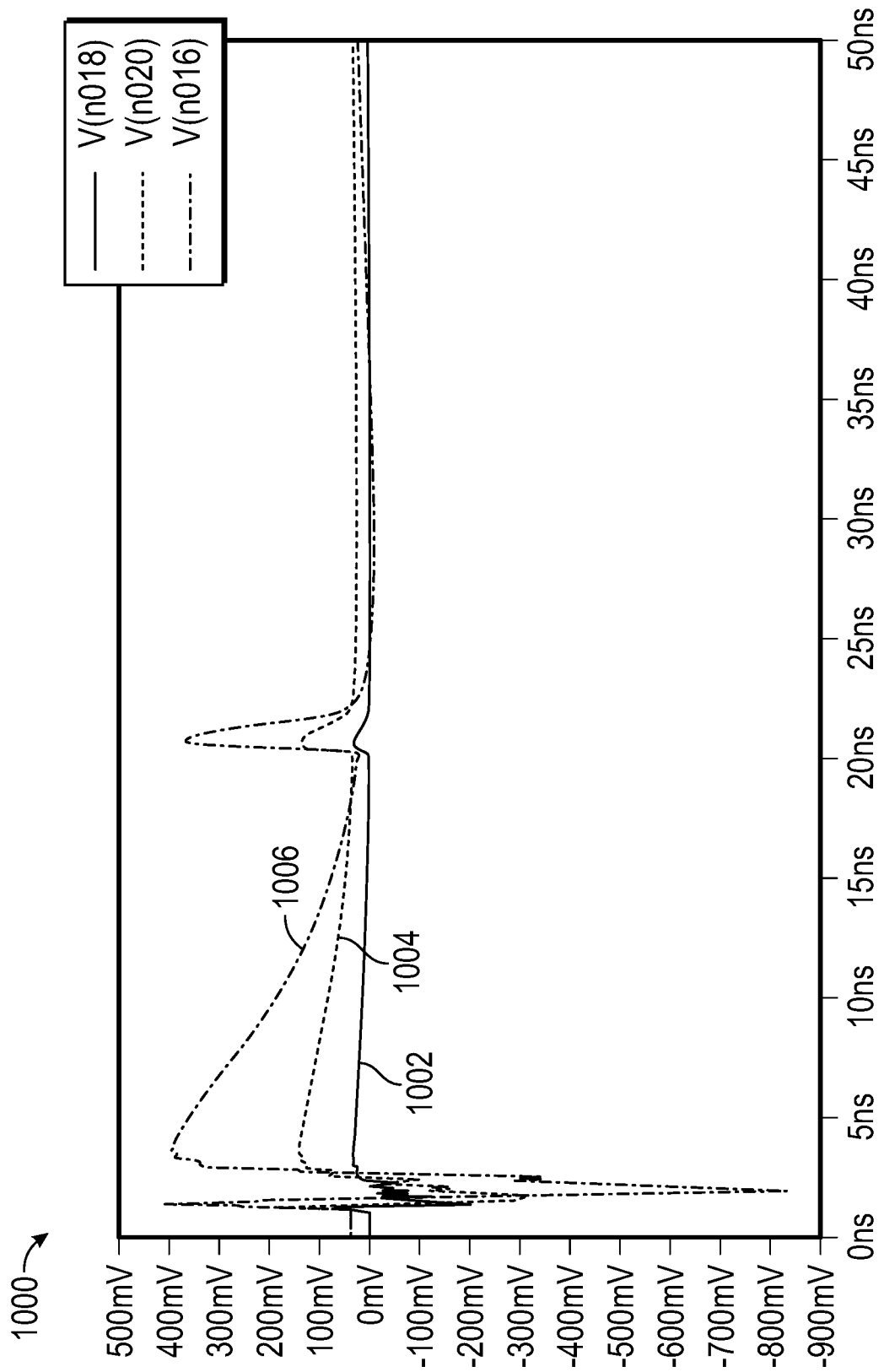
FIG. 10 depicts a plot of an electrical signal, in accordance with one or more example embodiments of the disclosure.

FIG. 10 depicts an example plot 1000. In some embodiments, the plot 1000 may depict electrical signal 1002, electrical signal 1004, and electrical signal 1006. Each of electrical signals 1002, 1004, and 1006 may represent signal outputs at each of the successive gain stages of the circuit (e.g., gain stages 210, 212, and 214 of circuit 200, or gain stages 410, 412, and 414 of circuit 400). As mentioned above, the gain stages may be utilized to amplify the electrical signal output of the pole-zero cancellation subcircuit so as to improve the detectability of the return signal relative to the remainder of the signal (e.g. enhance the amplitude of the return signal). For example, electrical signal 1002, 1004, and 1006 may show that the amplitude of the return signal 1010 increases as the electrical signal passes through each gain stage. The plot 1000 may also show that overshoot and/or undershoot may also be amplified through these successive gain stages, but such amplification may be removed and/or mitigating through tuning of the circuitry.

Figure 11:
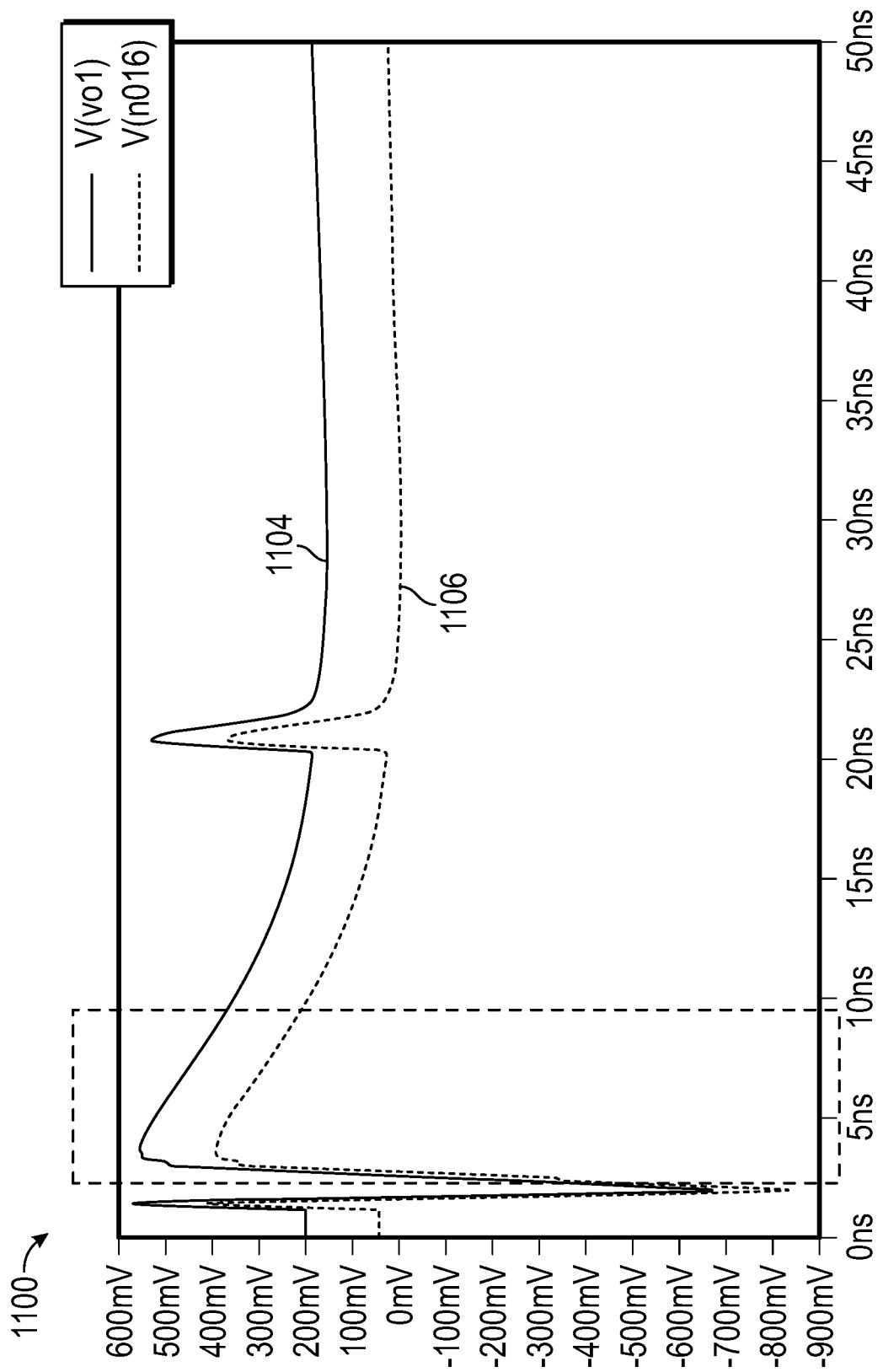
FIG. 11 depicts a plot of an electrical signal, in accordance with one or more example embodiments of the disclosure.

FIG. 11 depicts an example plot 1100. Plot 1100 may include electrical signal 1104 and electrical signal 1106, where electrical signal 1106 may be a baseline shifted version of electrical signal 1104. Baseline shifting may be applied to the electrical signal so that the zero level of the electrical signal is at the bottom of the dynamic range of the photodetector. This may allow the entire amplitude of the return signal to be detectable by the photodetector. Baseline shifting may be performed, for example, by the baseline shifting subcircuit 215 and/or the baseline shifting subcircuit 415, as well as any other circuit element depicted herein.

Figure 12:
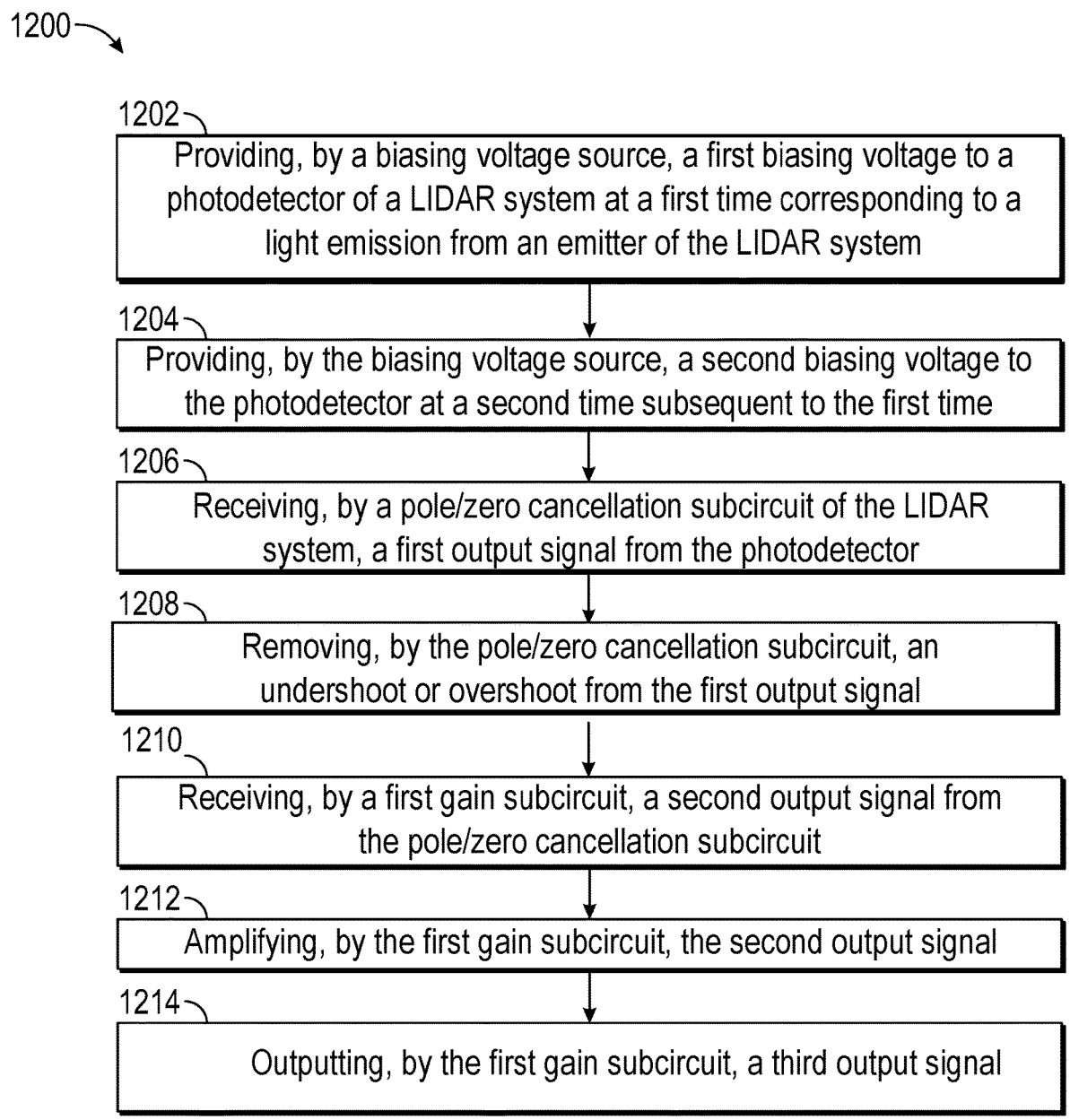
FIG. 12 depicts a method, in accordance with one or more example embodiments of the disclosure.

FIG. 12 is a flow of an example method 1200 of the present disclosure. In some embodiments, the method 1200 includes a step 1202 of providing, by a biasing voltage source, a first biasing voltage to a photodetector of a LIDAR system at a first time corresponding to a light emission from an emitter of the LIDAR system. In some embodiments, the method 1200 includes a step 1204 of providing, by the biasing voltage source, a second biasing voltage to the photodetector at a second time subsequent to the first time. In some embodiments, the method 1200 includes a step 1206 of receiving, by a pole/zero cancellation subcircuit of the LIDAR system, a first output signal from the photodetector. In some embodiments, the method 1200 includes a step 1208 of removing, by the pole/zero cancellation subcircuit, an undershoot or overshoot from the first output signal. In some embodiments, the method 1200 includes a step 1210 of receiving, by a first gain subcircuit, a second output signal from the pole/zero cancellation subcircuit. In some embodiments, the method 1200 includes a step 1212 of amplifying, by the first gain subcircuit, the second output signal. In some embodiments, the method 1200 includes a step 1214 of outputting, by the first gain subcircuit, a third output signal.

Figure 13:
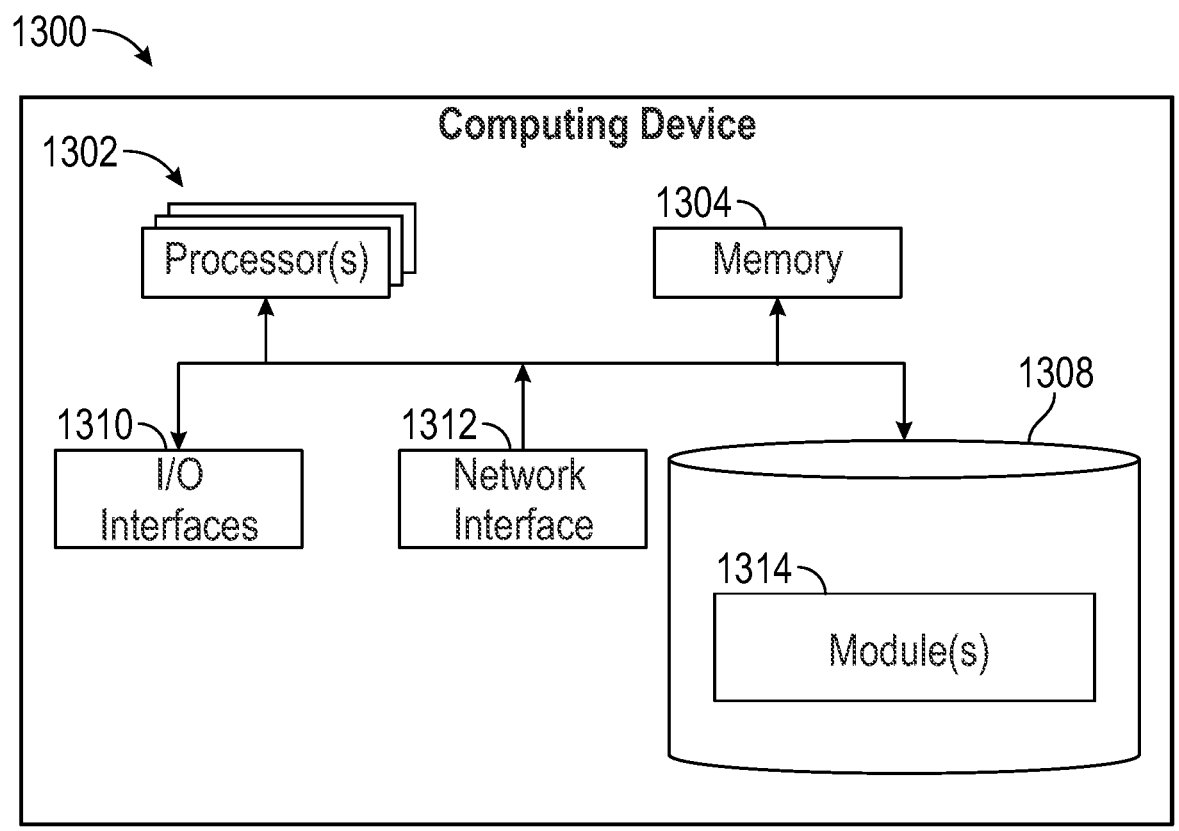
FIG. 13 depicts an example computing system, in accordance with one or more example embodiments of the disclosure.

FIG. 13 illustrates an example computing system 1300, in accordance with one or more embodiments of this disclosure. The computing system 1300 may be representative of any number of elements described herein. The computing system 1300 may include at least one processor 1302 that executes instructions that are stored in one or more memory devices (referred to as memory 1304). The instructions can be, for instance, instructions for implementing functionality described as being carried out by one or more modules and systems disclosed above or instructions for implementing one or more of the methods disclosed above. The processor(s) 1302 can be embodied in, for example, a CPU, multiple CPUs, a GPU, multiple GPUs, a TPU, multiple TPUs, a multi-core processor, a combination thereof, and the like. In some embodiments, the processor(s) 1302 can be arranged in a single processing device. In other embodiments, the processor(s) 1302 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 1302 can access the memory 1304 by means of a communication architecture 1306 (e.g., a system bus). The communication architecture 1306 may be suitable for the particular arrangement (localized or distributed) and type of the processor(s) 1302. In some embodiments, the communication architecture 1306 can include one or many bus architectures, such as a memory bus or a memory controller; a peripheral bus; an accelerated graphics port; a processor or local bus; a combination thereof, or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and/or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 1304 also can retain data.

Each computing system 1300 also can include mass storage 1308 that is accessible by the processor(s) 1302 by means of the communication architecture 1306. The mass storage 1308 can include machine-accessible instructions (e.g., computer-readable instructions and/or computer-executable instructions). In some embodiments, the machine-accessible instructions may be encoded in the mass storage 1308 and can be arranged in components that can be built (e.g., linked and compiled) and retained in computer-executable form in the mass storage 1308 or in one or more other machine-accessible non-transitory storage media included in the computing system 1300. Such components can embody, or can constitute, one or many of the various modules disclosed herein. Such modules are illustrated as erroneous data identification modules 1314. In some instances, the modules may also be included within the memory 1304 as well.

Execution of the erroneous data identification modules 1314, individually or in combination, by at least one of the processor(s) 1302, can cause the computing system 1300 to perform any of the operations described herein (for example, the operations described with respect to FIG. 12, as well as any other operations).

Each computing system 1300 also can include one or more input/output interface devices 1310 (referred to as I/O interface 1310) that can permit or otherwise facilitate external devices to communicate with the computing system 1300. For instance, the I/O interface 1310 may be used to receive and send data and/or instructions from and to an external computing device.

The computing system 1300 also includes one or more network interface devices 1312 (referred to as network interface(s) 1312) that can permit or otherwise facilitate functionally coupling the computing system 1300 with one or more external devices. Functionally coupling the computing system 1300 to an external device can include establishing a wireline connection or a wireless connection between the computing system 1300 and the external device. The network interface devices 1312 can include one or many antennas and a communication processing device that can permit wireless communication between the computing system 1300 and another external device. For example, between a vehicle and a smart infrastructure system, between two smart infrastructure systems, etc. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like. The communication processing device can also process data according to other protocols as well, such as vehicle-to-infrastructure (V2I) communications, vehicle-to-vehicle (V2V) communications, and the like. The network interface(s) 512 may also be used to facilitate peer-to-peer ad-hoc network connections as described herein.

It should further be appreciated that the LIDAR system may include alternate and/or additional hardware, software, or firmware components beyond those described or depicted without departing from the scope of the disclosure. More particularly, it should be appreciated that software, firmware, or hardware components depicted as forming part of the computing device are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (for example data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (for example data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (for example computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

That which is claimed is:
1. A LIDAR system comprising:
an emitter;
a photodetector;
a biasing voltage source that is configured to provide a first biasing voltage to the photodetector at a first time corresponding to a first light signal emitted by the emitter, and is also configured to provide a second biasing voltage to the photodetector at a second time subsequent to the first time;
a pole/zero cancellation subcircuit configured to receive a first output signal from the photodetector, wherein the first output signal is based on a return light signal associated with the first light signal, wherein the pole/zero cancellation subcircuit is also configured to remove an undershoot or overshoot from the first output signal to generate a second output signal; and
a first gain subcircuit configured to amplify the second output signal to generate a third output signal.

2. The LIDAR system of claim 1, wherein provide the first biasing voltage causes the photodetector to turn off and provide the second biasing voltage causes the photodetector to turn on.

3. The LIDAR system of claim 1, further comprising a switching subcircuit configured to prevent a second output signal of the photodetector from being received by the pole/zero cancellation subcircuit.

4. The LIDAR system of claim 1, wherein the pole/zero cancellation subcircuit is further configured to remove a pole and remove a decaying exponential shape of the first output signal of the photodetector.

5. The LIDAR system of claim 1, further comprising a buffer subcircuit configured to receive the first output signal from the photodetector.

6. The LIDAR system of claim 1, wherein the biasing voltage of the photodetector at the first time is lower than the biasing voltage of the photodetector at the second time.

7. The LIDAR system of claim 1, further comprising a second gain subcircuit configured to receive the third output signal from the first gain subcircuit.

8. A method comprising:
providing, by a biasing voltage source, a first biasing voltage to a photodetector of a LIDAR system at a first time corresponding to a light emission from an emitter of the LIDAR system;
providing, by the biasing voltage source, a second biasing voltage to the photodetector at a second time subsequent to the first time;
receiving, by a pole/zero cancellation subcircuit of the LIDAR system, a first output signal from the photodetector;
removing, by the pole/zero cancellation subcircuit, an undershoot or overshoot from the first output signal;
receiving, by a first gain subcircuit, a second output signal from the pole/zero cancellation subcircuit;
amplifying, by the first gain subcircuit, the second output signal; and
outputting, by the first gain subcircuit, a third output signal.

9. The method of claim 8, wherein providing the first biasing voltage causes the photodetector to turn off and providing the second biasing voltage causes the photodetector to turn on.

10. The method of claim 8, further comprising:
preventing, by a switching subcircuit of the LIDAR system, a second output signal of the photodetector from being received by the pole/zero cancellation subcircuit.

11. The method of claim 8, further comprising:
removing, by the pole/zero cancellation subcircuit, a pole and remove a decaying exponential shape of the first output signal of the photodetector.

12. The method of claim 8, further comprising:
receiving, by a buffer subcircuit of the LIDAR system, the first output signal from the photodetector.

13. The method of claim 8, wherein the biasing voltage of the photodetector at the first time is lower than the biasing voltage of the photodetector at the second time.

14. The method of claim 8, further comprising:
receiving, by a second gain subcircuit of the LIDAR system, the third output signal from the first gain subcircuit.

15. A circuit comprising:
an emitter;
a photodetector;
a biasing voltage source that is configured to provide a first biasing voltage to the photodetector at a first time corresponding to a first light signal emitted by the emitter, and is also configured to provide a second biasing voltage to the photodetector at a second time subsequent to the first time;
a pole/zero cancellation subcircuit configured to receive a first output signal from the photodetector, wherein the first output signal is based on a return light signal associated with the first light signal, wherein the pole/zero cancellation subcircuit is also configured to remove an undershoot or overshoot from the first output signal to generate a second output signal; and
a first gain subcircuit configured to amplify the second output signal to generated a third output signal.

16. The circuit of claim 15, wherein provide the first biasing voltage causes the photodetector to turn off and provide the second biasing voltage causes the photodetector to turn on.

17. The circuit of claim 15, further comprising a switching subcircuit configured to prevent a second output signal of the photodetector from being received by the pole/zero cancellation subcircuit.

18. The circuit of claim 15, wherein the pole/zero cancellation subcircuit is further configured to remove a pole and remove a decaying exponential shape of the first output signal of the photodetector.

19. The circuit of claim 15, further comprising a buffer subcircuit configured to receive the first output signal from the photodetector.

20. The circuit of claim 15, wherein the biasing voltage of the photodetector at the first time is lower than the biasing voltage of the photodetector at the second time.

* * * * *